(12) United States Patent
Wegner et al.

(10) Patent No.: US 9,056,595 B2
(45) Date of Patent: Jun. 16, 2015

(54) WINDSHIELD WIPER DRIVE

(71) Applicant: Robert Bosch GmbH, Stuttgart (DE)

(72) Inventors: Norbert Wegner, Buehl (DE); Juergen Rapp, Lauf (DE); Andreas Mueller, Herxheim (DE); Guillaume Boulch, Eberbach/Seitz (FR); Christian Acker, Fort-Louis (FR); Pierre Harnist, Roeschwoog (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/324,412

(22) Filed: Jul. 7, 2014

(65) Prior Publication Data

US 2014/0317870 A1      Oct. 30, 2014

Related U.S. Application Data

(62) Division of application No. 12/812,861, filed as application No. PCT/EP2008/063925 on Oct. 16, 2008, now Pat. No. 8,800,097.

(30) Foreign Application Priority Data

Dec. 12, 2007   (DE) .................. 10 2007 059 905

(51) Int. Cl.
    *B60S 1/06*    (2006.01)
    *B60S 1/18*    (2006.01)
    *B60S 1/34*    (2006.01)
    *B60S 1/16*    (2006.01)
    *B60S 1/04*    (2006.01)

(52) U.S. Cl.
    CPC ............... *B60S 1/3493* (2013.01); *B60S 1/163* (2013.01); *B60S 1/349* (2013.01); *B60S 1/0436* (2013.01); *B60S 1/185* (2013.01); *B60S 1/3443* (2013.01)

(58) Field of Classification Search
    CPC .... B60S 1/0436; B60S 1/3493; B60S 1/3443; B60S 1/185; B60S 1/349; B60S 1/3436; B60S 1/163
    USPC ................ 15/250.3, 250.31, 250.13, 250.34; 296/96.15, 96.17
    See application file for complete search history.

(56) References Cited

U.S. PATENT DOCUMENTS 2,046,108 A * 6/1936 Drew ........................... 15/250.3
2,744,282 A * 5/1956 Dyer et al. ................... 15/250.3

(Continued)

FOREIGN PATENT DOCUMENTS

DE    19744906 A1    4/1998
EP    0806330 A2    11/1997

(Continued)

OTHER PUBLICATIONS

PCT/EP2008/063925 International Search Report.

*Primary Examiner* — Gary Graham
(74) *Attorney, Agent, or Firm* — Michael Best & Friedrich LLP

(57) ABSTRACT

A windshield wiper drive for a motor vehicle, with a reverse-operating driving motor for driving a wiper shaft which is connected in a rotationally fixed manner to a wiper arm, and with a fastening plate for fastening the windshield wiper drive to a vehicle body or to a component mounted on the body, wherein a first end stop surface for limiting the rotational movement of the wiper shaft in a first direction of rotation is provided on the fastening plate and/or on a component fixed to the fastening plate.

16 Claims, 2 Drawing Sheets

(56) References Cited

U.S. PATENT DOCUMENTS

| | | | |
|---|---|---|---|
| 2,837,758 A * | 6/1958 | Adams et al. | 15/250.13 |
| 4,066,291 A | 1/1978 | Hickman | |
| 5,956,800 A * | 9/1999 | Morin et al. | 15/250.31 |
| 6,026,536 A * | 2/2000 | Miller et al. | 15/250.31 |
| 7,000,283 B2 | 2/2006 | Rapp | |

FOREIGN PATENT DOCUMENTS

| | | |
|---|---|---|
| FR | 2774340 A1 | 8/1999 |
| JP | 2007237863 | 9/2007 |
| KR | 20050044301 | 5/2005 |

\* cited by examiner

WINDSHIELD WIPER DRIVE

CROSS REFERENCE TO RELATED APPLICATIONS

This application is a divisional of U.S. patent application Ser. No. 12/812,861 filed Dec. 16, 2010, which is a national stage filing under 35 U.S.C. 371 of International Application No. PCT/EP2008/063925 filed Oct. 16, 2008, which claims foreign priority to German Patent Application No. 102007059905.8 filed Dec. 12, 2007, the disclosures of which are incorporated herein by reference. Priority to each application is hereby claimed.

BACKGROUND OF THE INVENTION

The invention relates to a windshield wiper drive for a motor vehicle.

In windshield wiper drives used nowadays, an electric driving motor is connected to the wiper shaft via a crank assembly. A continuous rotational movement of the driving motor is converted by the crank assembly into an oscillating movement of the wiper shaft to and fro. Disadvantages of the known windshield wiper drives include the complex construction and the number of components required.

"Windshield wiper direct drives" have therefore been developed, in which the provision of a crank assembly is omitted. In windshield wiper direct drives, either the motor shaft of a reverse-operable driving motor is connected in a rotationally fixed manner to the wiper shaft, or the motor shaft forms said wiper shaft, or a toothed gear mechanism is arranged between the motor shaft and the wiper shaft. A disadvantage of windshield wiper direct drives is that the wiper shaft is theoretically rotatable through 360° when large external displacement forces are applied. During journeys at a high speed, this may result in the wiper arm which is fixed to the wiper shaft being pivoted due to the forces in effect into a region outside the vehicle window, which constitutes a considerable safety risk.

SUMMARY OF THE INVENTION

The invention is based on the problem of proposing an optimized windshield wiper drive, in particular a windshield wiper direct drive, in which the maximum angular range through which the wiper shaft is rotatable is limited.

The invention is based on the concept of providing a first stop surface for limiting the rotational movement of the wiper shaft in a first direction of rotation on a fastening plate for fixing the windshield wiper drive to a body or to a component mounted on the body. As an alternative, said first end stop surface may also be provided on a component fixed to the fastening plate. It is essential that the first end stop surface is arranged and designed in such a manner that it can limit the maximum angle of rotation of the wiper shaft in a first direction of rotation. For this purpose, in order to limit the rotational movement, the first end stop surface does not necessarily have to interact directly with the wiper shaft—an embodiment can also be realized, in which the first end stop surface of the fastening plate or of the component fixed to the fastening plate interacts directly with a component connected in a rotationally fixed manner to the wiper shaft, in particular with the wiper arm. By means of the provision of a first end stop surface for limiting the maximum rotational movement or the maximum angle of rotation of the wiper shaft, it is avoided that a maximum angle of rotation can be exceeded by the wiper shaft, and therefore the wiping region of the wiper arm on the window is not strayed from. An embodiment of the windshield wiper drive is particularly preferred, in which the end stop surface is not used during normal operation, i.e. the wiper shaft or a component fixed thereto does not strike against the first end stop surface during each pivoting movement in the first direction of rotation. It is preferable for the first end stop surface to form a type of emergency stop or emergency limit. During normal operation, the wiper shaft should be reversed prior to striking against the end stop surface by means of an appropriate design of the motor control system. It lies within the scope of the invention that the first end stop surface limits a lower parking position of the wiper shaft or of the wiper arm or an upper or lateral maximum end pivoted position.

The window wiper drive designed in accordance with the concept of the invention is preferably a windshield wiper direct drive without a crank assembly, in which either the wiper shaft is connected in a rotationally fixed manner to the motor shaft, or is formed by the motor shaft, or in which the wiper shaft is connected directly to the wiper shaft in a torque-transmitting manner via a toothed gear mechanism and/or worm wheel gear mechanism, i.e. without the interconnection of a crank assembly.

In a development of the invention, it is advantageously provided that a second end stop surface for limiting the rotational movement or the pivoting angle of the wiper shaft in a second direction of rotation opposed to the first direction of rotation is provided in addition to the first end stop surface for limiting the rotational movement or the pivoting angle of the wiper shaft in a first direction of rotation. In other words, the wiper shaft can be displaced at maximum in a region between the two end stop surfaces. By means of the provision of two end stop surfaces which are spaced apart from each other in the circumferential direction, the maximum rotational movement of the wiper shaft or the maximum pivoting movement of the wiper arm in both pivoting directions is therefore limited.

In order to enable optimum fixing of the windshield wiper drive to the vehicle body, an embodiment is preferred in which the wiper shaft, which is designed as a single part or in multi-part form, is arranged such that it passes through the fastening plate. In other words, a preferably circumferentially closed through opening for receiving the wiper shaft is provided in the fastening plate.

In order to obtain a particularly compact design, an embodiment is preferred, in which the first and/or the second end stop surface are/is formed by the inner contour of the through opening. It is also preferred in this embodiment if at least one of the two end stop surfaces, preferably both end stop surfaces, are/is formed directly on the fastening plate. However, an embodiment can also be realized, in which one or both end stop surfaces is/are arranged on a component fixed to the fastening plate.

With regard to realizing the window wiper drive in a manner optimized in terms of costs, an embodiment is preferred, in which a first counterstop surface for interaction with the first end stop surface is formed on the wiper arm fixed to the wiper shaft. A second counterstop surface for interaction with the second end stop surface, which may optionally be provided, is preferably also provided on the wiper arm. Particularly preferably, the counterstop surfaces are located on an in particular circumferentially closed section of the wiper arm, which section surrounds the wiper shaft and projects in sections in the axial direction into a through opening in the fastening plate. At least that section of the wiper arm which has at least one counterstop surface for interaction with an end stop surface of the fastening plate or with an end stop surface on a component fixed to the fastening plate is particularly preferably an injection molded part made from plastic.

In addition or as an alternative, an embodiment can be realized, in which the first counterstop surface and/or the second counterstop surface are/is arranged directly on the wiper shaft or on a component connected in a rotationally fixed manner to the wiper shaft. This component which has at least one counterstop surface is preferably a component which is pressed onto the wiper shaft. An embodiment is particularly preferred, in which the component is received between two shaft parts of the wiper shaft, as seen in the axial direction, wherein said shaft parts can preferably be plugged one into the other.

A particularly compact design of the windshield wiper drive can be realized if the first and the second end stop surface are arranged on two sides facing away from each other of a radially inwardly directed radial section of the fastening plate. Said radial section preferably projects radially inward into the through opening for receiving the wiper shaft. As an alternative, the radial section together with the two end stop surfaces is not formed directly by the fastening plate but rather by a component fixed to the fastening plate. In order to ensure an exact course of pivoting of the wiper arm relative to the fastening plate and at the same time interaction of the end stop surfaces with corresponding counterstop surfaces, an embodiment is preferred, in which the radial section together with the two end stop surfaces projects in the radial direction into a guide slot formed on the wiper arm, wherein the guide slot preferably extends over an angular region of a wiper arm section directed in the axial direction and is limited by one counterstop surface on each of the two end sides which are opposite each other in the circumferential direction.

In an alternative embodiment, the two counterstop surfaces are not arranged at the ends of a guide slot but rather are formed by two sides facing away from each other and spaced apart from each other in the circumferential direction of a radially outwardly directed radial section of the wiper shaft. As an alternative, the radial section is not formed directly by the wiper shaft but rather by a component fixed to the wiper shaft. The radial section together with the two counterstop surfaces which are spaced apart in the circumferential direction advantageously projects in the radial direction into a guide slot which is either arranged directly on the fastening plate or on a component fixed to the fastening plate, wherein the guide slot extends over an angular region in the circumferential direction and has an end stop surface on both end sides which are spaced apart from each other in the circumferential direction, wherein each end stop surface is designed and arranged for interaction with a respective counterstop surface provided on the radial section.

In order to permit as defined and exact a positioning or fixing as possible of the windshield wiper drive on the vehicle body or on a component mounted on the vehicle body, the fastening plate preferably has three fastening openings which are spaced apart from one another in the circumferential direction and in each of which a fastening screw can be received. In addition or as an alternative, differently designed fastening means may be provided.

BRIEF DESCRIPTION OF THE DRAWINGS

Further advantages, features and details of the invention emerge from the description below of preferred exemplary embodiments and with reference to the drawings, in which.

DETAILED DESCRIPTION

Identical components and components with the same function are identified by the same reference numbers in the figures.

Figure 1:
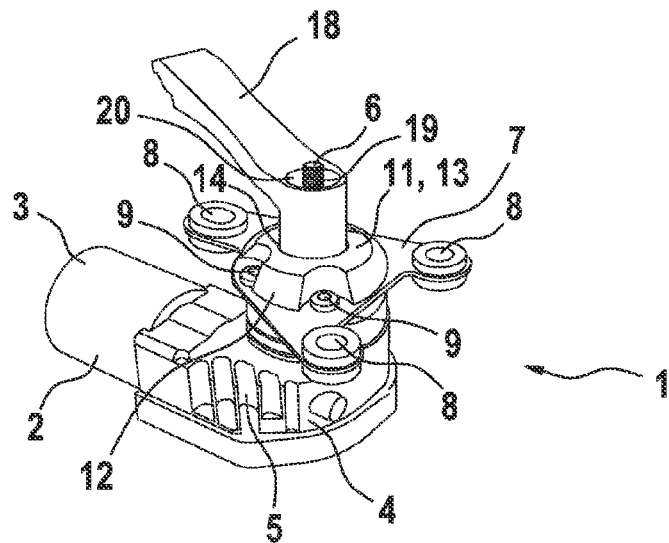
FIG. 1 shows a perspective view of a first exemplary embodiment of a windshield wiper drive.
Figure 2:
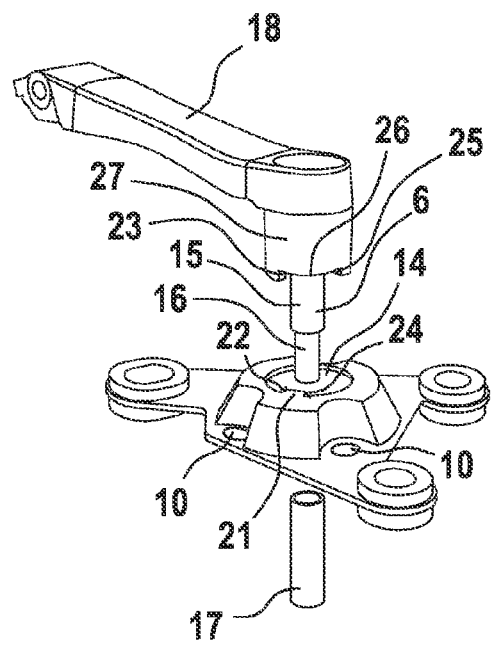
FIG. 2 shows an exploded illustration of the part of the windshield wiper drive according to FIG. 1.

FIGS. 1 and 2 show a first exemplary embodiment of a windshield wiper drive 1 designed as a windshield wiper direct drive.

The windshield wiper drive 1 comprises an electric driving motor 3 which is arranged in a motor housing 2 and can be reverse-operated by means of a motor control system (not shown). In the exemplary embodiment shown, the driving motor 3 is connected via a gear mechanism 5, which is arranged in a gear mechanism housing 4 and has no crank rod, to a wiper shaft 6 in a torque-transmitting manner. An embodiment can also alternatively be realized, in which a gear mechanism 5 is omitted, and the motor shaft of the driving motor 3 forms the wiper shaft 6 or is connected in a rotationally fixed manner to a wiper shaft 6. In the exemplary embodiment shown, the motor housing 2 which is designed as a deep-drawn part is flange-mounted laterally on the gear mechanism housing 4. To fix the windshield wiper drive 1 to a vehicle body, the windshield wiper drive 1 comprises a metal fastening plate 7 with three fastening openings 8 spaced apart in the circumferential direction.

The fastening plate 7 is fixed to the gear mechanism housing 4 with the aid of three fixing screws 9 which pass through respective fixing openings 10 in the fastening plate 7.

The fixing openings 10 are arranged around the edge of an elevation 11 which has a slightly obliquely rising circumferential wall 12 and an upper annular section 13 running substantially at right angles to the circumferential wall 12. The annular section 13 delimits a through opening 14, through which the wiper shaft 6 passes, radially on the outside. As is apparent from FIG. 2, the wiper shaft 6 is designed in two parts and consists of an upper shaft part 15 which can be inserted by a lower axial section 16 into a lower shaft part 17. The wiper shaft 6 is connected by the upper shaft part 15 in a rotationally fixed manner to a wiper arm 18 or to an articulated section of a wiper arm 18, to which a wiper blade (not shown) can be fixed. The two-part design of the wiper shaft 6 has the advantage that a cap to guard against water can be fitted in a simple manner. An external threaded section 19 is provided at the end of the upper shaft part 15, said external threaded section serving to receive a fixing nut 20 by means of which the wiper arm 18 can be fixed in turn to the wiper shaft 6.

As emerges in particular from FIG. 2, the through opening 14 for receiving the wiper shaft 6 has a substantially circular contour. At one point, said circular contour is interrupted by a radial section 21 which projects inward in the radial direction into the through opening 14. On the side which is on the left in the plane of the drawing, the radial section 21 is delimited by a first end stop surface 22 which, in the fitted state, interacts with a first counterstop surface 23 to limit the rotational movement of the wiper shaft 6. On the side facing away from the first end stop surface 22 in the circumferential direction, the radial section 21 is delimited by a second end stop surface 24 which, in the fitted state, interacts with a second counterstop surface 25. In this case, the two end stop surfaces 22, 24 project radially inward.

The two counterstop surfaces 23, 25 delimit a guide slot 26 in the circumferential direction on a section 27 of the wiper arm 18, which section extends in the axial direction. In this case, the guide slot 26 is designed as a recess extending in the circumferential direction in the circumferential wall of the section 27. The outside diameter of the section 27 substantially corresponds to the diameter of the through opening 14 minus a small amount of play, and therefore the wiper arm 18 in the fitted state is guided on the inner circumference of the through opening 14, in which case the maximum pivoting angle is limited by the relatively large circumferential extent of the guide slot 26, the end sides of which, which is spaced apart in the circumferential direction, are formed, as mentioned, by counterstop surfaces 23, 25 which interact with the end stop surfaces 22, 24 on the radially inwardly pointing radial section 21.

Figure 3:
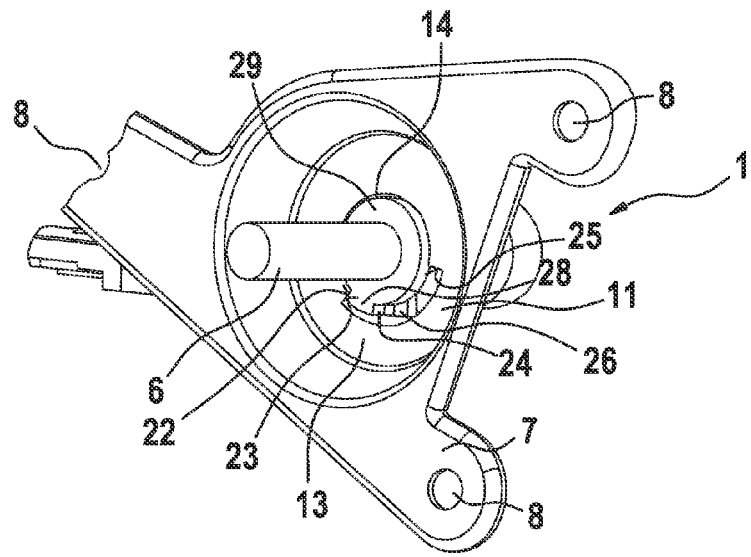
FIG. 3 shows a perspective view of a second, alternative exemplary embodiment of a windshield wiper drive.
Figure 4:
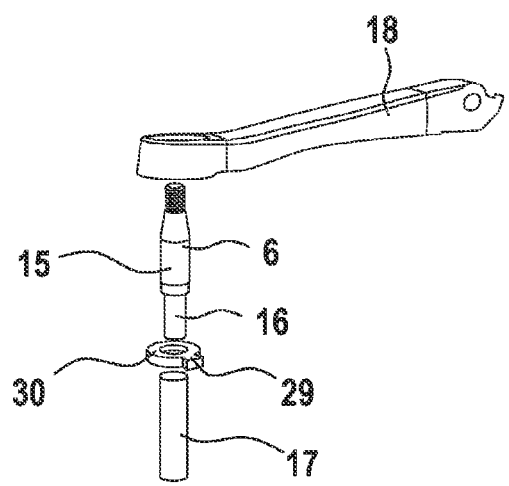
FIG. 4 shows an exploded illustration of a part of the windshield wiper drive according to FIG. 3.

FIGS. 3 and 4 show an alternative exemplary embodiment of a windshield wiper drive 1 which is designed as a windshield wiper direct drive, wherein the illustration of the driving motor and of the gear mechanism or gear mechanism housing has been omitted for reasons of clarity. Said features may be designed, for example, as in the exemplary embodiment according to FIGS. 1 and 2. To avoid repetitions, essentially only the differences over the exemplary embodiment according to FIG. 1 are entered into below. With regard to the common features, reference is made to FIGS. 1 and 2 and to the associated description of the figures.

FIG. 3 shows the fastening plate 7 together with the fastening openings 8 therein for fixing the windshield wiper drive 1 to a vehicle body. As in the exemplary embodiment according to FIG. 1, the fastening plate 7 has a dome-like elevation 11 with an upper annular section 13 which delimits a through opening 14 which has a substantially circular ring contour. The through opening 14 merges in an angular region into a guide slot 26 which is designed as a recess in the fastening plate 7 and as a radial extension of the through opening 14. The guide slot 26 extends in the shape of a circular arc in the circumferential direction and is delimited by one counterstop surface 23, 25 at each of the two end sides which are spaced apart from each other in the circumferential direction. The counterstop surfaces 23, 25 interact with the end stop surfaces 22, 24 which delimit a radial section 28, which points outward in the radial direction, in the circumferential direction. The radial section 28 is arranged on a component 29 which has an annular section 30 (cf. FIG. 4) through which the wiper shaft 6, or more precisely the axial section 16 of the upper shaft part 15 of the wiper shaft 6, passes. The component 29 is connected together with the annular section 30 thereof to the axial section 16 of the shaft 6 in a rotationally fixed manner. The outside diameter of the annular section 30 corresponds to the diameter of the through opening 14 in the fastening plate 7 minus an amount of play, and therefore the wiper shaft 6 is guided on the fastening plate 7 via the component 29.

The invention claimed is:

1. A windshield wiper drive (1) for a motor vehicle, with a reverse-operating driving motor (3) for driving a wiper shaft (6) which is connected in a rotationally fixed manner to a wiper arm (18), and with a fastening plate (7) for fastening the windshield wiper drive (1) to a vehicle body, wherein the wiper shaft passes through a through opening (14) in the fastening plate (7), wherein a first stop surface for limiting rotational movement of the wiper shaft (6) in a first direction of rotation is provided on the fastening plate (7), wherein a second stop surface for limiting the rotational movement of the wiper shaft (6) in a second direction of rotation opposed to the first direction of rotation is provided on the fastening plate (7), wherein one of the wiper arm and the wiper shaft has thereon a third stop surface for interaction with the first stop surface and a fourth stop surface for interaction with the second stop surface, wherein the fastening plate has a guide slot delimited by the first and second stop surfaces, wherein the guide slot extends in a circumferential direction and has one of the stop surfaces at each of two ends spaced apart in the circumferential direction, wherein the wiper arm or the wiper shaft has thereon a projection delimited by the third and fourth stop surfaces, and wherein the projection extends into the guide slot, such that rotational movement of the wiper shaft (6) in the first direction of rotation is limited by engagement of the first and third stop surfaces, and rotational movement of the wiper shaft (6) in the second direction of rotation is limited by engagement of the second and fourth stop surfaces, wherein the driving motor is arranged in a motor housing (2), wherein the driving motor is connected via a gear mechanism (5), which is arranged in a gear mechanism housing (4), to the wiper shaft (6) in a torque-transmitting manner, wherein the fastening plate is fixed to the gear mechanism housing by three fixing screws (9) which pass through respective fixing openings (10) in the fastening plate, and wherein the fixing openings (10) are arranged around an edge of an elevation (11) which has a rising circumferential wall (12) and an upper annular section (13) running substantially at right angles to the circumferential wall, the annular section delimiting the through opening.

2. The wiper drive as claimed in claim 1 wherein the projection is on a component fixed to the wiper shaft.

3. The wiper drive as claimed in claim 1 wherein the projection extends radially.

4. The wiper drive as claimed in claim 1 wherein, to fix the windshield wiper drive (1) to the vehicle body, the fastening plate (7) has therein three fastening openings (8) spaced apart in a circumferential direction, the fastening openings being configured to receive fasteners for fixing the fastening plate to the vehicle body.

5. The wiper drive as claimed in claim 1 wherein the slot is at least partially defined by the annular section (13).

6. A windshield wiper drive (1) for a motor vehicle, with a reverse-operating driving motor (3) for driving a wiper shaft (6) which is connected in a rotationally fixed manner to a wiper arm (18), and with a fastening plate (7) for fastening the windshield wiper drive (1) to a vehicle body, wherein the wiper shaft passes through a through opening (14) in the fastening plate (7), wherein the driving motor is connected via a gear mechanism (5), which is arranged in a gear mechanism housing (4), to the wiper shaft (6) in a torque-transmitting manner, wherein the fastening plate is fixed to the gear mechanism housing by three fixing screws (9) which pass through respective fixing openings (10) in the fastening plate, wherein, to fix the windshield wiper drive (1) to the vehicle body, the fastening plate (7) has therein three fastening openings (8) spaced apart in a circumferential direction, the fastening openings being configured to receive fasteners for fixing the fastening plate to the vehicle body, wherein the fastening plate has a guide slot delimited by a first stop surface for limiting rotational movement of the wiper shaft (6) in a first direction of rotation and by a second stop surface for limiting the rotational movement of the wiper shaft (6) in a second direction of rotation opposed to the first direction of rotation, wherein the guide slot extends in a circumferential direction and has one of the stop surfaces at each of two ends spaced apart in the circumferential direction, wherein one of the wiper arm and the wiper shaft has thereon a radial projection delimited by a third stop surface for interaction with the first stop surface and by a fourth stop surface for interaction with the second stop surface, and wherein the projection extends into the guide slot, such that rotational movement of the wiper shaft (6) in the first direction of rotation is limited by engagement of the first and third stop surfaces, and rotational movement of the wiper shaft (6) in the second direction of rotation is limited by engagement of the second and fourth stop surfaces.

7. The wiper drive as claimed in claim 6 wherein the projection is on a component fixed to the wiper shaft.

8. The wiper drive as claimed in claim 6 wherein the fixing openings (10) are arranged around an edge of an elevation (11) which has a rising circumferential wall (12) and an upper annular section (13) running substantially at right angles to the circumferential wall, the annular section delimiting the through opening.

9. The wiper drive as claimed in claim 8 wherein the slot is at least partially defined by the annular section (13).

10. The wiper drive as claimed in claim 6 wherein the fixing openings (10) are arranged around an edge of an elevation (11) which has a rising circumferential wall (12) and an upper annular section (13) running substantially perpendicular to the wiper shaft, the annular section delimiting the through opening.

11. The wiper drive as claimed in claim 10 wherein the slot is at least partially defined by the annular section (13).

12. A windshield wiper drive (1) for a motor vehicle, with a reverse-operating driving motor (3) for driving a wiper shaft (6) which is connected in a rotationally fixed manner to a wiper arm (18), and with a fastening plate (7) for fastening the windshield wiper drive (1) to a vehicle body, wherein the wiper shaft passes through a through opening (14) in the fastening plate (7), wherein a first stop surface for limiting rotational movement of the wiper shaft (6) in a first direction of rotation is provided on the fastening plate (7), wherein a second stop surface for limiting the rotational movement of the wiper shaft (6) in a second direction of rotation opposed to the first direction of rotation is provided on the fastening plate (7), wherein one of the wiper arm and the wiper shaft has thereon a third stop surface for interaction with the first stop surface and a fourth stop surface for interaction with the second stop surface, wherein the fastening plate has a guide slot delimited by the first and second stop surfaces, wherein the guide slot extends in a circumferential direction and has one of the stop surfaces at each of two ends spaced apart in the circumferential direction, wherein the wiper arm or the wiper shaft has thereon a projection delimited by the third and fourth stop surfaces, and wherein the projection extends into the guide slot, such that rotational movement of the wiper shaft (6) in the first direction of rotation is limited by engagement of the first and third stop surfaces, and rotational movement of the wiper shaft (6) in the second direction of rotation is limited by engagement of the second and fourth stop surfaces, wherein the driving motor is arranged in a motor housing (2), wherein the driving motor is connected via a gear mechanism (5), which is arranged in a gear mechanism housing (4), to the wiper shaft (6) in a torque-transmitting manner, wherein the fastening plate is fixed to the gear mechanism housing by three fixing screws (9) which pass through respective fixing openings (10) in the fastening plate, and wherein the fixing openings (10) are arranged around an edge of an elevation (11) which has a rising circumferential wall (12) and an upper annular section (13) running substantially perpendicular to the wiper shaft, the annular section delimiting the through opening.

13. The wiper drive as claimed in claim 12 wherein the projection is on a component fixed to the wiper shaft.

14. The wiper drive as claimed in claim 12 wherein the projection extends radially.

15. The wiper drive as claimed in claim 12 wherein, to fix the windshield wiper drive (1) to the vehicle body, the fastening plate (7) has therein three fastening openings (8) spaced apart in a circumferential direction, the fastening openings being configured to receive fasteners for fixing the fastening plate to the vehicle body.

16. The wiper drive as claimed in claim 12 wherein the slot is at least partially defined by the annular section (13).

* * * * *